US012638607B2

(12) United States Patent (10) Patent No.: US 12,638,607 B2
Zhao et al. (45) Date of Patent: May 26, 2026

(54) SONIC LOG SYNTHESIS

(71) Applicant: Halliburton Energy Services, Inc.,
Houston, TX (US)

(72) Inventors: Jiajun Zhao, Houston, TX (US);
Ruijia Wang, Singapore (SG)

(73) Assignee: HALLIBURTON ENERGY
SERVICES, INC., Houston, TX (US)

( * ) Notice: Subject to any disclaimer, the term of this
patent is extended or adjusted under 35
U.S.C. 154(b) by 405 days.

(21) Appl. No.: 18/128,498

(22) Filed: Mar. 30, 2023

(65) Prior Publication Data

US 2024/0329271 A1 Oct. 3, 2024

(51) Int. Cl.
G01V 1/50 (2006.01)

(52) U.S. Cl.
CPC .......... G01V 1/50 (2013.01); *G01V 2210/612*
(2013.01); *G01V 2210/6161* (2013.01); *G01V*
*2210/6163* (2013.01); *G01V 2210/6167*
(2013.01); *G01V 2210/6169* (2013.01); *G01V*
*2210/6222* (2013.01); *G01V 2210/6242*
(2013.01); *G01V 2210/66* (2013.01)

(58) Field of Classification Search
CPC ............... G01V 1/50; G01V 2210/612; G01V
2210/6161; G01V 2210/6163; G01V
2210/6167; G01V 2210/6169; G01V
2210/6222; G01V 2210/6242; G01V
2210/66
See application file for complete search history.

(56) References Cited

U.S. PATENT DOCUMENTS

| | | | | |
|---|---|---|---|---|
| 4,740,928 A | * | 4/1988 | Gutowski | G01V 1/50 |
| | | | | 367/27 |
| 10,482,174 B1 | * | 11/2019 | Goodsitt | G06V 10/82 |
| 11,002,871 B2 | * | 5/2021 | Dumont | G01V 1/46 |
| 11,525,352 B2 | * | 12/2022 | Al Ismail | E21B 49/00 |
| 2004/0064258 A1 | * | 4/2004 | Ireland | E21B 47/00 |
| | | | | 702/9 |
| 2004/0133531 A1 | * | 7/2004 | Chen | G06N 3/09 |
| | | | | 706/46 |
| 2017/0103144 A1 | * | 4/2017 | Badri | G01V 1/302 |

(Continued)

FOREIGN PATENT DOCUMENTS

| | | | | | |
|---|---|---|---|---|---|
| WO | WO-2020236153 A1 | * | 11/2020 | | G01V 1/50 |
| WO | WO-2022050967 A1 | * | 3/2022 | | G06N 3/045 |

OTHER PUBLICATIONS

Abstract of Glubokovskikh, Stanislav et al., "Machine learning
algorithms for real-time prediction of the sonic logs based on
drilling parameters and downhole accelerometers", https://doi.org/
10.1190/segam2020-3427085.1; Published Sep. 25, 2020.

(Continued)

*Primary Examiner* — Stephanie E Bloss
(74) *Attorney, Agent, or Firm* — NOVAK DRUCE
CARROLL LLP

(57) ABSTRACT

Aspects of the subject technology relate to systems, meth-
ods, and computer-readable media for synthesizing sonic
logs for downhole environments. Data associated with a
wellbore in a formation is accessed. A model configured to
identify one or more characteristics associated with sound
traveling through one or more formation is accessed. The
data is applied to the model to predict a characteristics of the
formation that is identifiable through sonic logging.

20 Claims, 13 Drawing Sheets

(56) References Cited

U.S. PATENT DOCUMENTS

| 2021/0132253 | A1* | 5/2021 | Alshammery ......... G01V 20/00 |
|---|---|---|---|
| 2021/0230998 | A1* | 7/2021 | Chen ....................... E21B 7/067 |
| 2021/0326721 | A1* | 10/2021 | Zhang ................... G06N 3/082 |
| 2021/0389492 | A1* | 12/2021 | Yang .................... G06F 17/142 |
| 2022/0187493 | A1* | 6/2022 | Smith ................... G06N 3/045 |
| 2022/0268144 | A1* | 8/2022 | Al-Abduljabbar ...... E21B 44/00 |
| 2022/0372860 | A1* | 11/2022 | Allen .............. G06Q 10/06313 |
| 2025/0179904 | A1* | 6/2025 | Cancio Rocha Da Silva Junior .. |
| | | | E21B 45/00 |

OTHER PUBLICATIONS

Abstract of Gowida, Ahmad et al., "Prediction of Sonic Wave Transit Times From Drilling Parameters While Horizontal Drilling in Carbonate Rocks Using Neural Networks", Petrophysics 61 (05): 482-494; SPWLA-2020-v61n5a6; Oct. 1, 2020.

* cited by examiner

200

START

ACCESS DATA ASSOCIATED WITH A WELLBORE IN A FORMATION
300

ACCESS A MODEL CONFIGURED TO IDENTIFY ONE OR MORE CHARACTERISTICS ASSOCIATED WITH SOUND TRAVELING THROUGH ONE OR MORE FORMATIONS
302

APPLY THE DATA TO THE MODEL TO PREDICT A CHARACTERISTIC OF THE FORMATION THAT IS IDENTIFIABLE THROUGH SONIC LOGGING
304

END

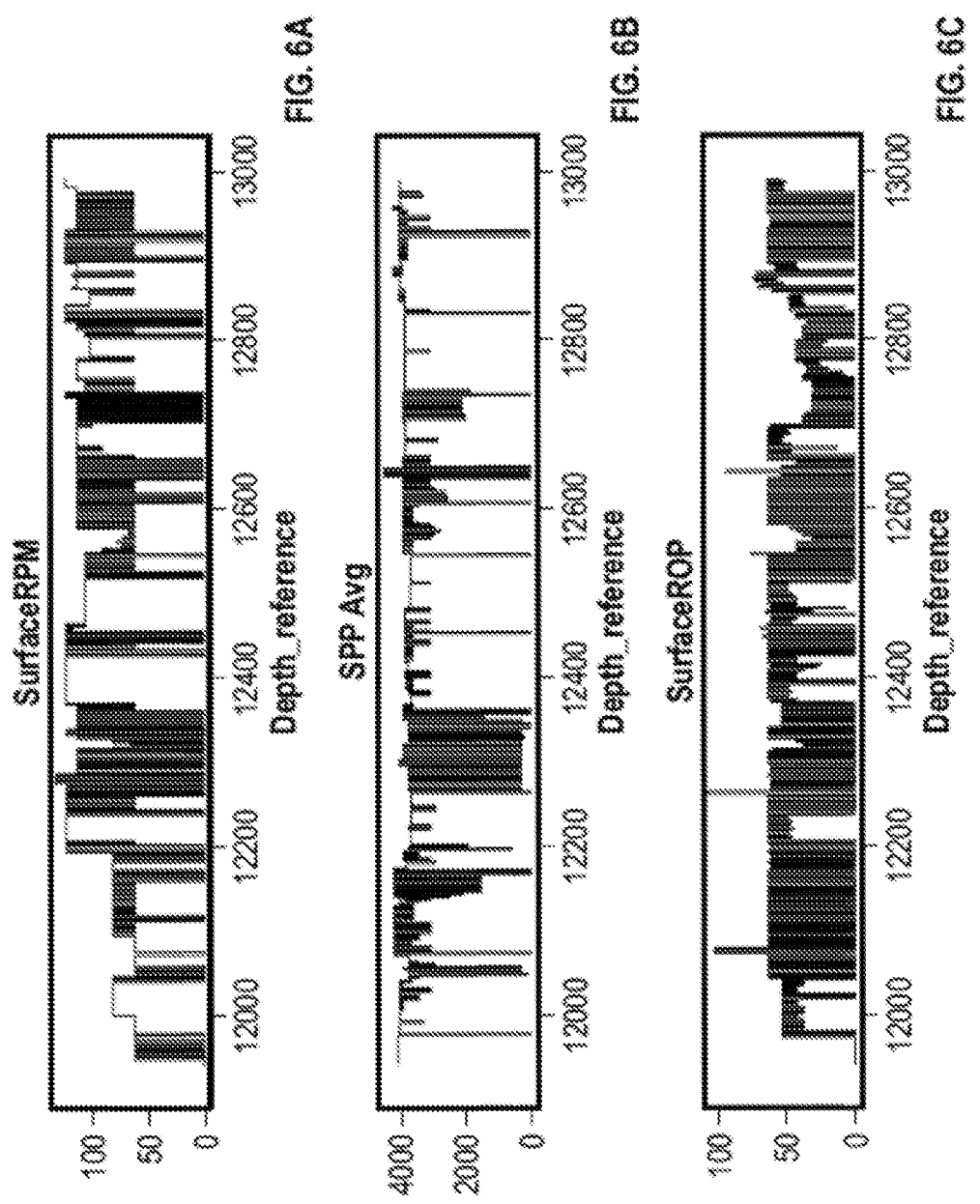

Calculated_ROP

Depth_reference

MseWithSurfaceWobTob

Depth_reference

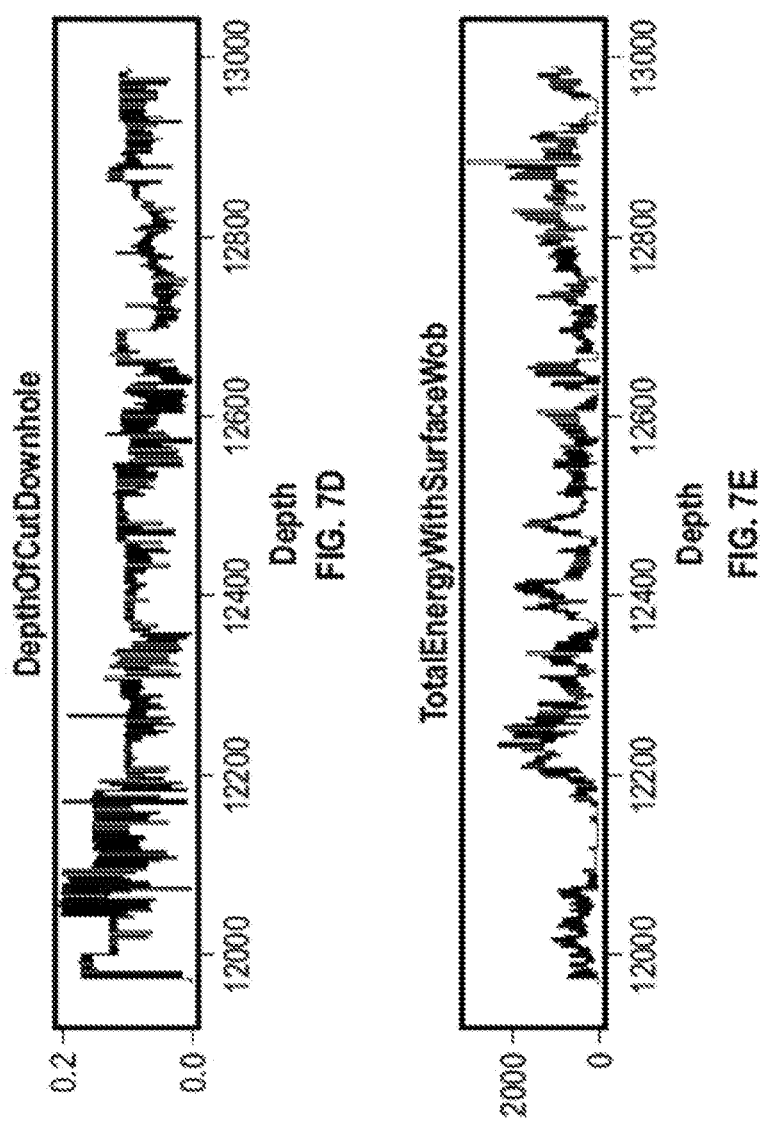

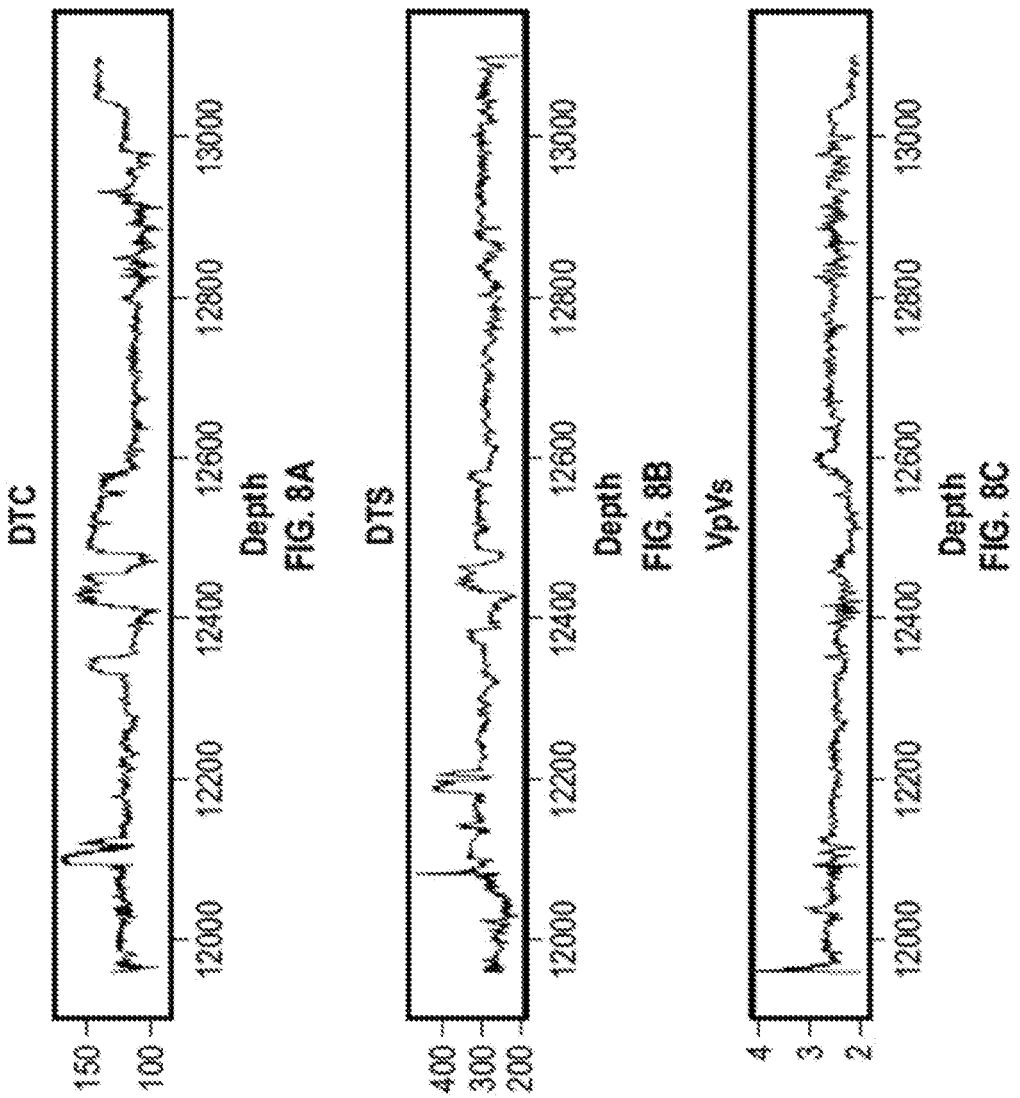

SONIC LOG SYNTHESIS

TECHNICAL FIELD

The present technology pertains to synthesizing sonic logs for downhole environments accessible through wellbores, and more particularly, to synthesizing sonic logs based on either or both cross logs and drilling dynamics.

BACKGROUND

Well logs are interpreted to estimate petrophysical and geomechanical properties as part of subsurface characterization. Among well logs, sonic logs can be used to determine formation type, porosity, saturating fluid parameters, and dynamic elastic parameters. As part of performing sonic logging, compressional and shear transmit times can be determined using sonic logging tools. However, it can be difficult to obtain full sonic logs of a well either because sonic logging is not performed or it is performed at limited depth intervals.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

FIG. 6A illustrates a graph of surface RPM as a function of depth, in accordance with various aspects of the subject technology.

FIG. 6B illustrates a graph of SPP as a function of depth, in accordance with various aspects of the subject technology.

FIG. 6C illustrates a graph of surface ROP as a function of depth, in accordance with various aspects of the subject technology.

FIG. 7D illustrate a graph of processed calculated ROP as a function of depth, in accordance with various aspects of the subject technology.

FIG. 7E illustrates a graph of processed MSE weight-on-bit and torque-on-bit as a function of depth, in accordance with various aspects of the subject technology.

FIG. 8A illustrate an example of compressional wave slowness, otherwise referred to as DTC, as a function of depth, in accordance with various aspects of the subject technology.

FIG. 8B illustrates an example of shear wave slowness, otherwise referred to as DTS, as a function of depth, in accordance with various aspects of the subject technology.

FIG. 8C illustrates an example of the ratio of DTS over DTC as a function of depth, in accordance with various aspects of the subject technology.

DETAILED DESCRIPTION

Figure 1A:
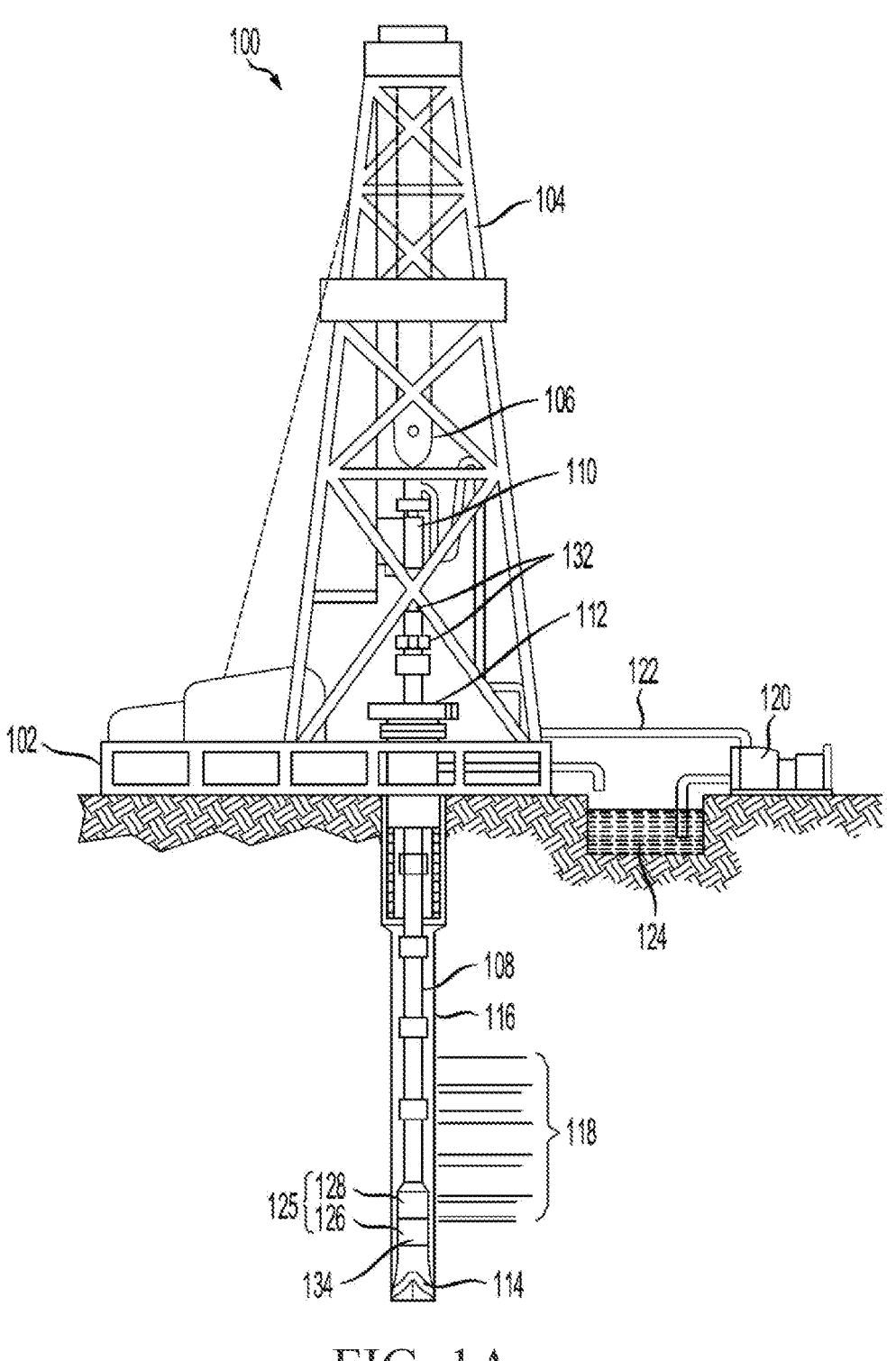
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, well logs are interpreted to estimate petrophysical and geomechanical properties as part of subsurface characterization. Among well logs, sonic logs can be used to determine formation type, porosity, saturating fluid parameters, and dynamic elastic parameters. As part of performing sonic logging, compressional and shear transmit times can be determined using sonic logging tools. However, it can be difficult to obtain full sonic logs of a well either because sonic logging is not performed or it is performed at limited depth intervals.

Specifically, accurate knowledge of the mechanical properties of the subsurface can be used in identifying the appropriate equipment and drilling parameters for a specific formation. The mechanical properties can be identified through sonic logging. However, sonic logging is not usually performed in corresponding parts of a wellbore that are adjacent to non-reservoir parts of a formation. As follows, complete sonic logs are not created for wellbores that neighbor planned wellbores. Accordingly, sonic logs that are performed in appraisal wells that are located far from the planned wellbores are relied on to control drilling of the planned wellbores. However, the appraisal wells are drilled in formations that are different from the planned wellbores due to the spatial variability of geology. This makes it difficult to accurately predict what equipment should be used in drilling planned wellbores. As follows, it is difficult to accurately plan and select values of drilling parameters to use in drilling the planned wellbores.

The disclosed technology addresses the foregoing by applying a model to gathered downhole data in a wellbore to synthesize all or a portion of a sonic log. The downhole data can include drilling data that is gathered with respect to drilling a wellbore. Further, the downhole data can include other types of logs that are distinct from sonic logs, such as caliper log data, neutron log data, gamma ray log data, deep resistivity log data, medium resistivity log data, shallow resistivity log data, photoelectric factor, and density log data. The model can be trained using gathered downhole data and corresponding sonic log data of either or both a wellbore that is currently drilled or a neighboring wellbore. The gathered downhole data that is used to train the model can include drilling parameter information or other log data that is distinct from a sonic log data. Such downhole data can correspond to gathered sonic log data which can ultimately be used in training the model.

In various embodiments, a method can comprise accessing data associated with a wellbore in a formation. The method can also comprise accessing a model configured to identify one or more characteristics associated with sound traveling through one or more formations. Further, the method can comprise applying the data to the model to predict a characteristic of the formation that is identifiable through sonic logging.

In various embodiments, a system can include one or more processors and at least one computer-readable storage medium storing instructions which, when executed by the one or more processors, cause the one or more processors to access data associated with a wellbore in a formation. The instructions can also cause the one or more processors to access a model configured to identify one or more characteristics associated with sound traveling through one or more formations. Further, the instructions can cause the one or more processors to apply the data to the model to predict a characteristic of the formation that is identifiable through sonic logging.

In various embodiments, a computer-readable storage medium stores instructions which, when executed by one or more processors, cause the one or more processors to access data associated with a wellbore in a formation. The instructions can also cause the one or more processors to access a model configured to identify one or more characteristics associated with sound traveling through one or more formations. Further, the instructions can cause the one or more processors to apply the data to the model to predict a characteristic of the formation that is identifiable through sonic logging.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic pipe inspection tool as part of logging the wellbore using the electromagnetic pipe inspection tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
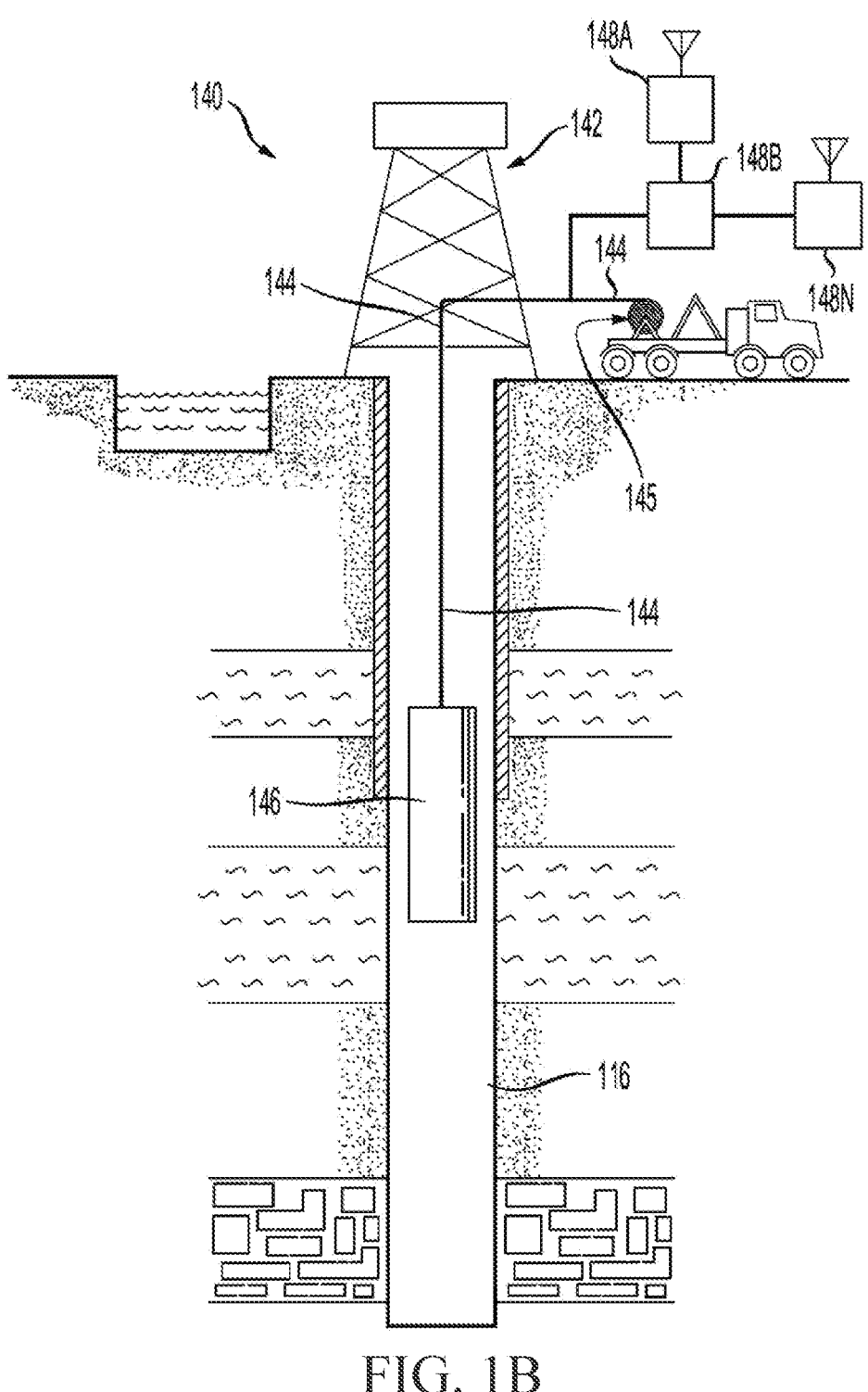
FIG. 1B is a schematic diagram of an example wireline logging environment, in accordance with various aspects of the subject technology.

Referring to FIG. 1B, an example system 140 is depicted for conducting downhole measurements after at least a portion of a wellbore has been drilled and the drill string removed from the well. An electromagnetic pipe inspection tool can be operated in the example system 140 shown in FIG. 1B to log the wellbore. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
FIG. 2 is a schematic diagram of an acoustic tool apparatus, in accordance with various aspects of the subject technology.

FIG. 2 is a schematic diagram of an acoustic tool apparatus 200. One or more transmitting sources (e.g., a monopole transmitter 202, X and Y dipole transmitters 204, 206, respectively) are used to create energy (pressure) waves 218 that travel in the borehole fluid 220 in the formation 214, to be received at the receivers RXN, RYN (e.g., at the X receiver array 208 and the wide receiver array 210) located at different spatial locations within the borehole 212.

Here apparatus 200 is shown in the form of an acoustic tool with monopole and dipole transmitting sources 202; and 204, 206, respectively. Apparatus 200 is disposed in borehole 212, with its longitudinal axis substantially aligned with the z-axis. This apparatus can be used in conjunction with the signal processing techniques described herein.

In some embodiments, as illustrated in FIG. 2, acoustic tool apparatus 200 includes an acoustic source (transmitter), and a set of receivers RXN, RYN that are spatially separated by distances ranging from several inches to several feet.

Apparatus 200 comprises two azimuthally orthogonal dipole transmitter sources, i.e., X-dipole transmitter source 204, and Y-dipole transmitter source 206. Sources 204, 206 can be used to excite the flexural mode. Apparatus 200 can also include ring transmitter source 202, for example, which is configured to excite a monopole mode, and/or a quadrupole source, which is configured to excite a screw wave.

Apparatus 200 also includes two azimuthally orthogonal receiver arrays 208, 210, aligned along the X and Y directions, respectively, to record pressure waveforms resulting from the energy waves 218 transmitted into the formation 214. Each receiver array 208, 210 has front and back receivers to form sum and difference channels. When the dipole transmitters 204, 206 are activated, the difference channels are used to record across dipole waveforms.

In some implementations, recorded flexural waveforms can be noted by in-line components, (XX, YY), and cross-line components, (XY, YX). The first letter refers to the transmitter, and the second letter to the receiver. Thus, for example, the XX recorded waveform is formed by firing the X-directed dipole transmitter and receiving the difference channel of the X-directed receiver array. When ring source 202 is activated, the sum channel is used to record different propagation modes, such as compressional, shear, Stoneley and pseudo-Rayleigh modes, among others. When a quadrupole source is activated, screw waves are obtained by taking the difference between a sum of the front and back receivers and a sum of the left and right receivers. While apparatus 200, as shown in FIG. 2, is useful to describe the details of the processing mechanism described herein, the particular arrangement of transmitters and receivers is not meant to limit the scope of the disclosed embodiments. Other physical arrangements of sources 202, 204, 206 and receivers RXN, RYN, are possible without departing from the scope of the disclosed technology.

Figure 3:
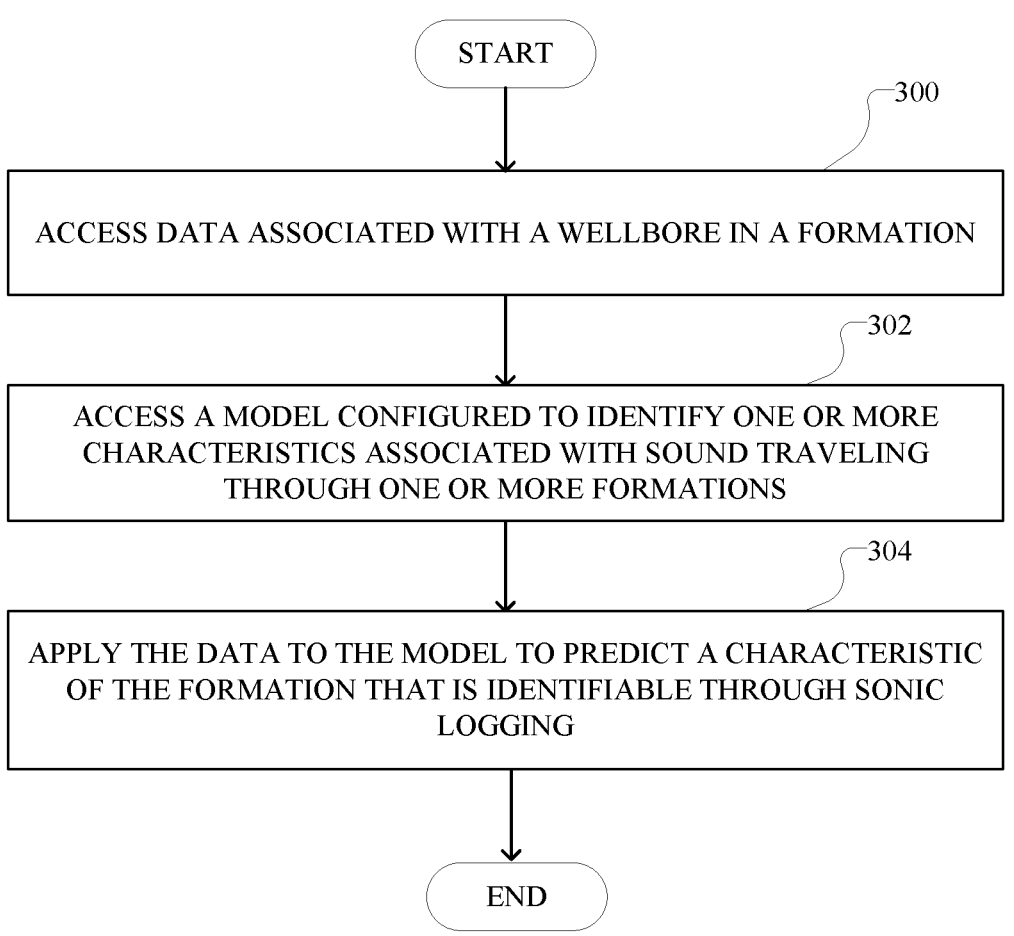
FIG. 3 illustrates a flowchart for an example method of synthesizing a sonic log for a formation, in accordance with various aspects of the subject technology.

The disclosure now continues with a discussion of techniques for overcoming the previously described deficiencies with respect to generating sonic logs for formations. Specifically, FIG. 3 illustrates a flowchart for an example method of synthesizing a sonic log for a formation. The method shown in FIG. 3 is provided by way of example, as there are a variety of ways to carry out the method. Additionally, while the example method is illustrated with a particular order of steps, those of ordinary skill in the art will appreciate that FIG. 3 and the modules shown therein can be executed in any order and can include fewer or more modules than illustrated. Each module shown in FIG. 3 represents one or more steps, processes, methods or routines in the method.

At step 300, data associated with a wellbore in a formation is accessed. Data associated with a wellbore can include applicable information that is gathered during creation of the wellbore. Specifically, data associated with a wellbore in a formation can include drilling data associated with operation of a drill string in drilling the wellbore. Drilling data can include applicable data related to drilling of a wellbore, such as torque, weight-on-bit, mud pumping rate, rotating speed, drilling fluid pumping pressure, rate of penetration, peak axial vibrations, absolute average vibrations, lateral vibrations, average pitch, average yaw, depth of cut downhole, and downhole temperature.

Data associated with the wellbore in the formation can also include applicable information that is gathered through the wellbore to describe characteristics of the formation. Specifically, data associated with the wellbore can include data that is used in logging, or otherwise evaluating, the formation. More specifically, data associated with the wellbore can include data generated in evaluating the formation through one or more techniques that are distinct from sonic logging. For example, data associated with the wellbore can comprise caliper log data, neutron log data, gamma ray log data, deep resistivity log data, medium resistivity log data, shallow resistivity log data, photoelectric factor and density log data, or a combination thereof.

Data associated with the wellbore can include data that is gathered for or in the wellbore itself. Further, data associated with the wellbore can include data that is gathered for or in a neighboring wellbore. For example, data associated with the wellbore can include log data that is gathered in a neighboring wellbore. A neighboring wellbore to a wellbore, as used herein, can include a wellbore that is within a specific or certain proximity to the wellbore. Further, a neighboring wellbore to a wellbore, as used herein, can include a neighboring wellbore that is in a formation having a specific amount of overlapping formation characteristics with a formation surrounding the wellbore.

At step 302, a model configured to identify one or more characteristics associated with sound traveling through one or more formations is accessed. Characteristics associated with sound traveling through a formation, as used herein, can include characteristics of a formation that are identifiable through applicable sonic logging tools, such as the sonic logging tools described herein. More specifically, characteristics of a formation that are identifiable through sonic logging can include compressional wave slowness of a portion of the formation, shear wave slowness of the portion of the formation, a ratio of the compressional wave slowness of the portion of the formation to the shear wave slowness of the portion of the formation, Young's modulus of the portion of the formation, Poisson's ratio of the portion of the formation, and vibrational types associated with the portion of the formation.

The model can include a mapping of data associated with a wellbore to specific characteristics associated with sound traveling through a formation, e.g. a formation surrounding the wellbore or a formation surrounding a distinct wellbore. Specifically, the model can include a mapping of drilling data to characteristics associated with sound traveling through a formation. For example, the model can include a mapping of drilling data to compressional and shear wave slowness in formations. Further, the model can include a mapping of logs distinct from sonic logs to characteristics associated with sound traveling through a formation. For example, the model can include a mapping of resistivity measurements to compressional and shear wave slowness in formations.

The model can account for depth dependency. Specifically, the model can map data associated with a wellbore to specific characteristics associated with sound traveling through a formation as a function of depth of the formation. For example, the model can map different drilling data as a function of depth in a wellbore to different shear wave slowness values. The model can account for depth by being trained on data that accounts for depth. Specifically and as will be discussed in greater detail later, data associated with the wellbore, such as drilling data or other log data, can be applied with corresponding sonic log data across different depth ranges to train the model.

At step 304, the data is applied to the model to predict a characteristic of the formation that identifiable through sonic logging. As discussed previously a characteristic of the formation that is identifiable through sonic logging can include compressional wave slowness of a portion of the formation, shear wave slowness of the portion of the formation, a ratio of the compressional wave slowness of the portion of the formation to the shear wave slowness of the portion of the formation, Young's modulus of the portion of the formation, Poisson's ratio of the portion of the formation, and vibrational types associated with the portion of the formation. The characteristics of the formation that is identifiable through sonic logging can serve as a substitute for data missing from a sonic log of the formation. For example, if a sonic log is only done at certain depths of a formation, then the characteristics of the formation can serve as sonic log data at the depths where sonic logging was not performed. This is advantageous, as it can solve the previously described deficiencies related to performing sonic logging in boreholes. Specifically, a more complete sonic log can be generated in a wellbore without having to sonically log all or portions of the wellbore.

Further, the characteristics of the formation that are predicted at step 304 can be used in controlling a drilling operation. Specifically, the sonic logs that are synthesized, at least in part, using the technology described herein can be used in more efficiently planning and performing drilling in a current wellbore being drilled. Further, the sonic logs that are synthesized, at least in part, using the technology described herein can be used in more efficiently planning and performing drilling in a planned wellbore, e.g. a neighboring planned wellbore. For example, the characteristics of the formation that are predicted at step 304 can be used to control a speed of a drill bit in drilling the wellbore through the formation. In another example, the characteristics of the formation that are predicted at step 304 can be used to select a type of drill bit for drilling a neighboring wellbore.

With respect to drill data being used as input to the model for predicting formation characteristics that are capable of being identified through sonic logging, a large number of different drilling features exist that can be applied as input. Such features can be included as part of drilling data in training the model and applied as input to the model according to the technology described herein. Such features include peak vibration along the x- and y-axes, absolute average vibration along the x- and y-axes, the lateral vibration, the average pitch, stand pipe pressure (herein "SPP") average, the average magnitude in the x- and y-axes, the axial vibration, the average acceleration in the x- and y-axes, the average yaw, the absolute average vibration in the z-axis, the peak vibration in the z-axis, the surface rate of penetration (herein "ROP"), the calculated ROP, the depth of cut downhole, the temperature, the average magnitude in the z-axis, the top drive torque, the stick slip index (herein "SSI") roll, the torsional vibration, the stick slip indicator, the average roll, the maximum roll, the minimum roll, the specific RPM (herein "specrpm") vibration in the x-axis, the specific RPM acceleration in the y-axes, the wobble, the hole diameter, the non-gyroscope bit speed, the bit speed, the surface RPM, the mechanical specific energy (herein "MSE") weight-on-bit and torque-on-bit, the total energy with surface weight-on-bit, the flow rate, the average acceleration in the z-axis, the specific RPM magnitude in the y-axis, and the surface weight-on-bit.

The drilling features can be grouped into different clusters. Table 1 shows an example of grouping of such features with corresponding cluster indexes.

TABLE 1

| Cluster Index | Features |
| --- | --- |
| 1 | Peak_VibeX, Peak_VibeY |
| 2 | AbsAvg_VibeX, AbsAvg_VibeY |
| 3 | LateralVibe |

TABLE 1-continued

| Cluster Index | Features |
|---|---|
| 4 | Avg_Pitch |
| 5 | SPP Avg |
| 6 | AVG_MagX, Avg_MagY |
| 7 | AxialVibe |
| 8 | Avg_AccelX, Avg_AccelY |
| 9 | Avg_Yaw |
| 10 | AbsAvg_VibeZ, Peak_VibeZ |
| 11 | Surface ROP, Calculated ROP, DepthOfCutDownhole, |
| 12 | Temperature, Avg_MagZ, TopDrive Torque |
| 13 | SSI_Roll, TorsionalVibe, StickSlipIndicator |
| 14 | Avg_Roll, Max_Roll, Min_Roll, SpecRPM_VibeY, SpecRpm_AccelY, Wobble, HoleDiameter, Non_Gyro_Bit_Speed, BitSpeed, SurfaceRPM |
| 15 | MSEWithSurfaceWobTob, TotalEnergyWithSurfaceWob |
| 16 | Flowrate |
| 17 | Avg_AccelZ |
| 18 | SpecRpm_MagY |
| 19 | SurfaceWOB |

Figure 4:
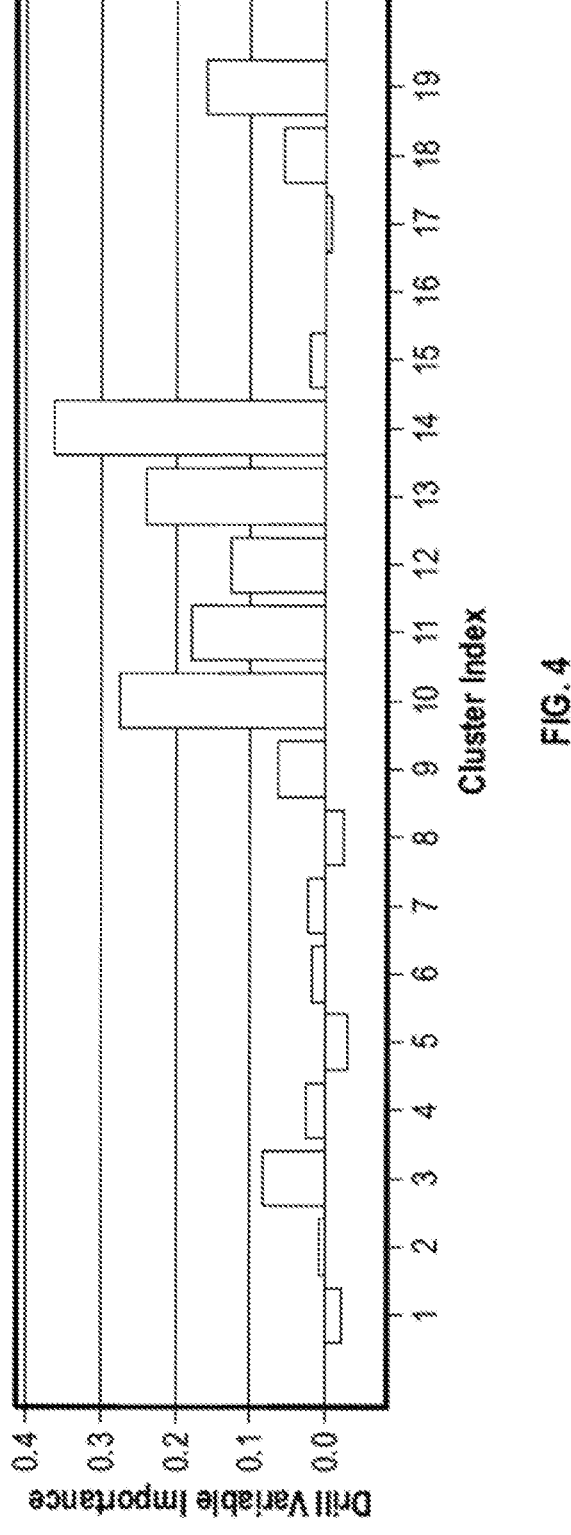
FIG. 4 is a graph of the importance of the different features clusters, in accordance with various aspects of the subject technology.

Further, the drilling features and clusters of drilling features can have varying impact in predicting or otherwise being correlated with specific sonic log features. For example, the absolute average vibration in the z axis can be more highly correlated with wave slowness in comparison the peak vibration in the x-axis. FIG. 4 is a graph of the importance of the different features clusters shown in Table 1. As shown in FIG. 4, clusters in indices 10, 11, 12, 13, and 14 are the most important, e.g. have a large impact on sonic log features in sonic log data. Specifically, in having a large impact on sonic log features in sonic log data, the drilling features in the specific clusters can greatly impact the capture of sonic log data downhole or the prediction of sonic log features as part of synthesizing sonic log data.

Figure 5:
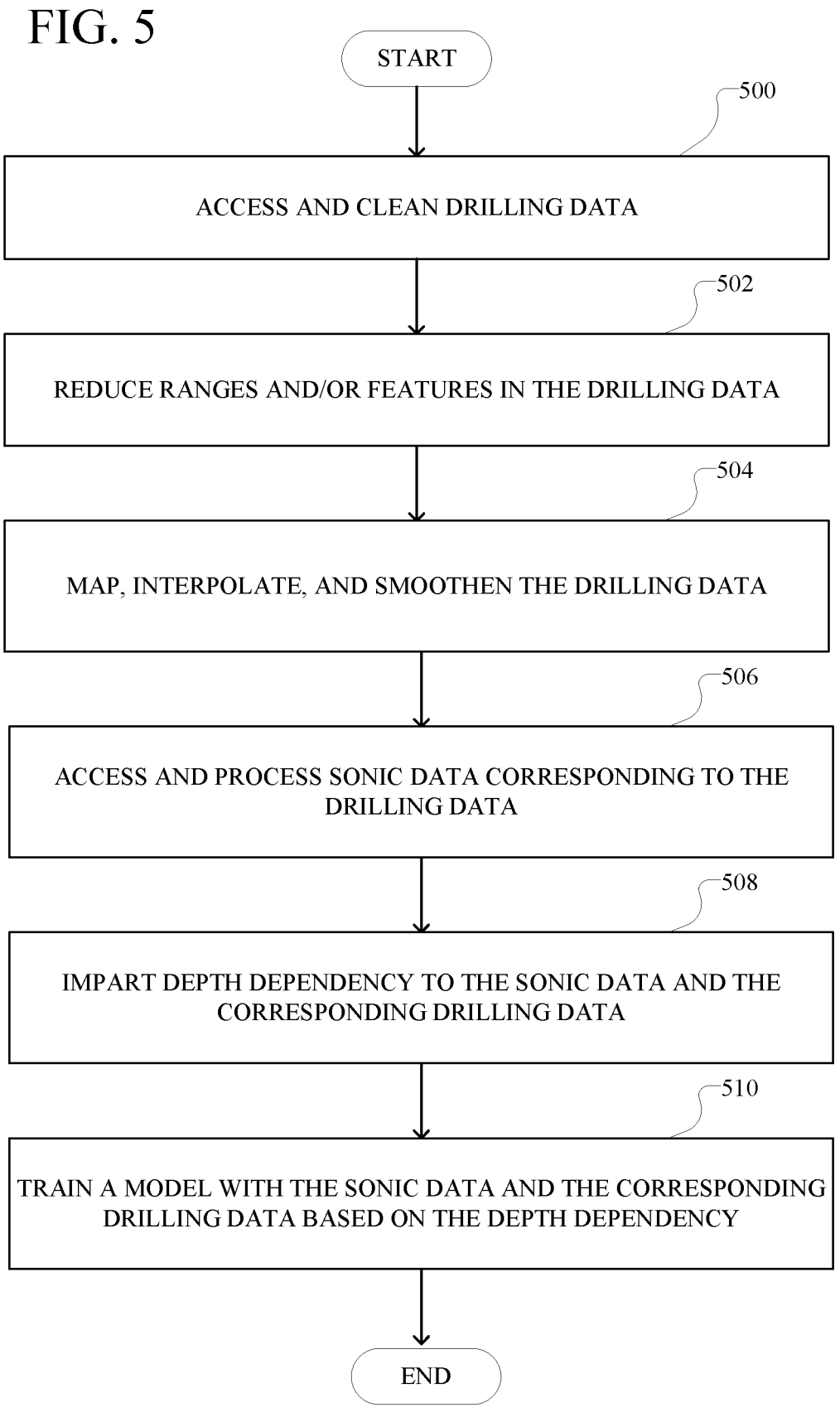
FIG. 5 illustrates a flowchart for an example method of training a sonic log synthesis model, in accordance with various aspects of the subject technology.

The disclosure now turns to a discussion of training the models described herein for predicting characteristics of a formation that are identifiable through sonic logging. Specifically, FIG. 5 illustrates a flowchart for an example method of training a sonic log synthesis model. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 5 represents one or more steps, processes, methods or routines in the method.

At step 500, drilling data is accessed and cleaned. The drilling data can include applicable data related to operation of a drill sting to form one or more wellbores. Specifically, the drilling data can include data describing any of the previously described drilling features. The drilling data can be for a current wellbore that is being drilled. Further, the drilling data can be for a previous wellbore that was drilled.

The drilling data can be captured by applicable sensors. Specifically, the drilling data can be captured by downhole sensors operating during a drilling operation of a wellbore. For example, the drilling data can be captured by drill bit sensors associated with a drill bit operating to drill a wellbore.

The captured drilling data can be cleaned after it is accessed. Applicable data cleaning processing techniques can be applied to the drilling data as part of cleaning the data. For example, the drilling data can be filtered and processed through applicable techniques to remove noise from the drilling data. Further, the drilling data can be processed through applicable techniques to remove artifacts from the drilling data.

Figures 6D, 6E:
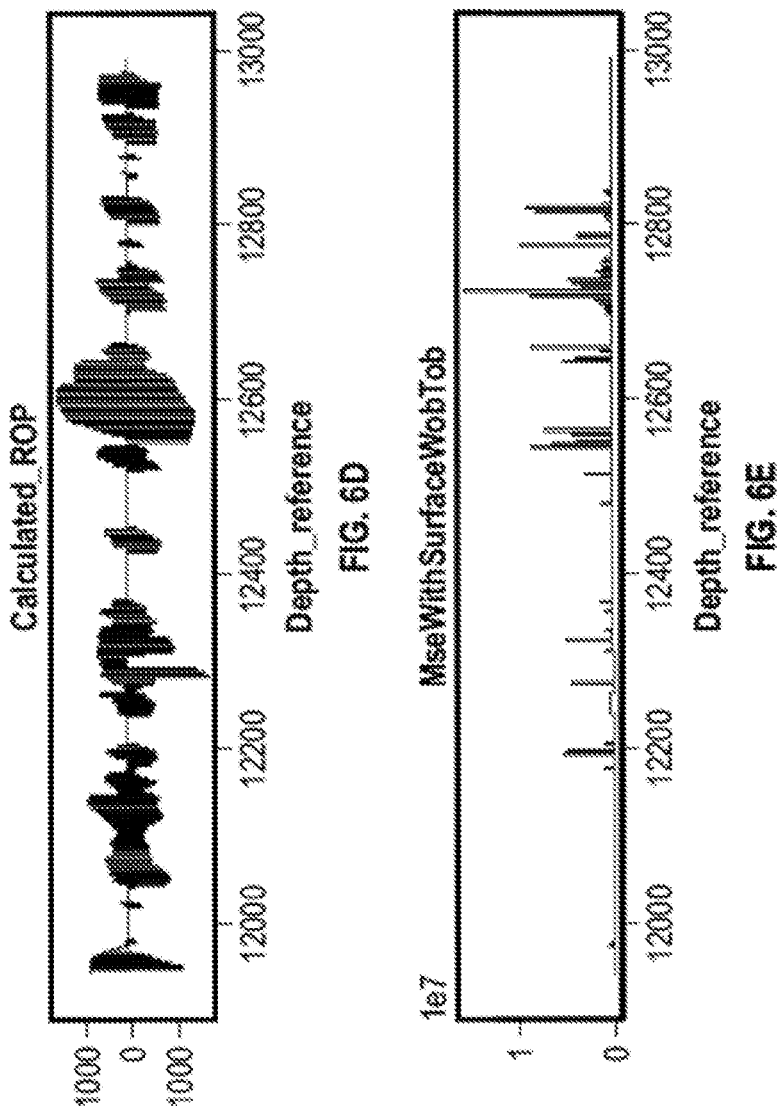
FIG. 6D illustrate a graph of calculated ROP as a function of depth, in accordance with various aspects of the subject technology.
FIG. 6E illustrates a graph of the MSE weight-on-bit and torque-on-bit as a function of depth, in accordance with various aspects of the subject technology.

The drilling data can be a function of depth in the wellbore, e.g. depth in the formation relative to the surface in drilling the wellbore. Specifically, FIGS. 6A-6E illustrate graphs of various drilling parameters/features as a function of depth. FIG. 6A illustrates a graph of surface RPM as a function of depth. FIG. 6B illustrates a graph of SPP as a function of depth. FIG. 6C illustrates a graph of surface ROP as a function of depth. FIG. 6D illustrate a graph of calculated ROP as a function of depth. FIG. 6E illustrates a graph of the MSE weight-on-bit and torque-on-bit as a function of depth.

Returning back to the flowchart shown in FIG. 5, at step 502, either or both ranges and features in the drilling data are reduced. Specifically, redundant variables in the drilling data can be identified. The redundant variables can be identified based on an amount of correlation between the drilling variables in relation to an impact on sonic log features in capturing and/or generating sonic log data. For example and with reference to Table 1, the features in respective indices 10, 11, 12, 13, and 14 are correlated with the other features in their respective indices. Further and as shown in FIG. 4, these indices have the highest impact on sonic log features in captured sonic log data.

After the redundant variables are identified, specific redundant variables can be removed to reduce the ranges and features in the drilling data. For example, redundant variables in any of the respective indices 10, 11, 12, 13, and 14 with reference to Table 1 can be removed. Further in the example, one of SSI roll and torsional vibration can be removed as the features are redundant with each other in their importance on sonic log data.

In reducing the ranges in drill data, the ranges of specific drilling parameters in the drilling data can be constricted or otherwise confined. Specifically, a subset of a specific range in which to confine the drilling data can be identified. In turn, the drilling data can be confined within the subset of the specific range. Confinement of specific ranges of variables in the drilling data can be performed based on input from an applicable source. For example, drill bit services can provide input on what ranges should be confined in the drilling data.

After either or both the removal of redundant variables and confinement of ranges in the drilling data, an applicable transform can be applied to drill variables that have large dynamic ranges to further reduce the ranges. Specifically, a logarithmic transform can be applied to variable that have large dynamic ranges to further reduce ranges.

The processes that are performed at step 502, e.g. the confinement of ranges and removal of redundant variables, can be performed as part of generating modified drilling data. As follows, the modified drilling data can be used in training a model for synthesizing sonic log data based on drilling data. Further, additional processes can be performed on the modified drilling data until it is ultimately used to train the model.

At step 504, the drilling data is mapped, interpolated, and smoothened. Specifically, at step 504, the drilling data can be mapped across varying depth levels of a wellbore to generate mapped drilling data. The drilling data can be mapped to a common depth axis, e.g. of choice, with specific intervals, e.g. specific intervals. The mapped drilling data can then be filtered to remove outliers in the mapped drilling data. Specifically, a moving-window filter, e.g. having a specific depth length, can be applied to the mapped drilling data to detect and subsequently remove any outlier data in the mapped drilling data.

After the mapped drilling data is created, the drilling data can be interpolated across different drilling variables and varying depth levels. Specifically, the drilling data can be interpolated to ensure that data for different drilling variables exist at specific depth levels. After the mapped drilled data is interpolated, the data can be smoothed using an applicable technique, such as a moving-window filter. The resultant data that is generated at step 504 can be used in training a model for synthesizing sonic log data based on drilling data. Further, additional processes can be performed on the mapped drilling data until it is ultimately used to train the model.

Figures 7A, 7B, 7C:
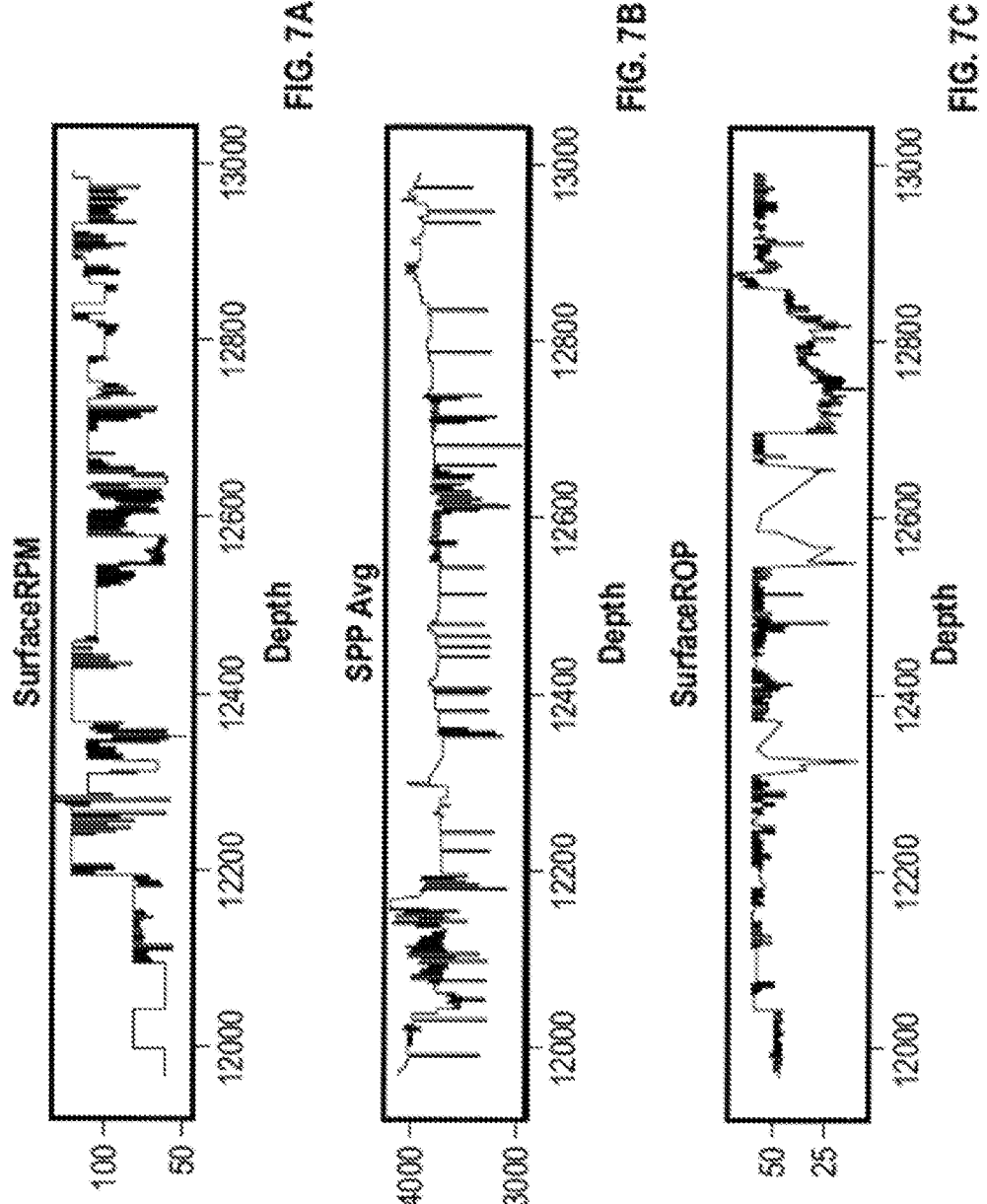
FIG. 7A illustrates a graph of processed surface RPM as a function of depth, in accordance with various aspects of the subject technology.
FIG. 7B illustrates a graph of processed SPP as a function of depth, in accordance with various aspects of the subject technology.
FIG. 7C illustrates a graph of processed surface ROP as a function of depth, in accordance with various aspects of the subject technology.

FIGS. 7A-7E illustrate graphs of the various drilling parameters/features shown in FIGS. 6A-E, after the drilling parameters have been processed according to the techniques described with respect to steps 500, 502, and 504. FIG. 7A illustrates a graph of processed surface RPM as a function of depth. FIG. 7B illustrates a graph of processed SPP as a function of depth. FIG. 7C illustrates a graph of processed surface ROP as a function of depth. FIG. 7D illustrate a graph of processed calculated ROP as a function of depth. FIG. 7E illustrates a graph of processed MSE weight-on-bit and torque-on-bit as a function of depth. As shown in FIGS. 7A-E in comparison to FIGS. 6A-E, the data is cleaner across depth intervals and shows discrete values across the depth intervals.

At step 506, sonic data corresponding to the drilling data is accessed and processed. In processing the sonic data, the techniques that are applied in processing the drilling data can also be applied to the sonic data. Specifically, one or more of cleaning of the sonic data, mapping of the sonic data across varying depth levels, removal of outliers in the sonic data, confinement of ranges in the sonic data, interpolation of the sonic data across the varying depth levels, and smoothing of the sonic data can be performed. In mapping and interpolating the sonic data, the sonic data can be mapped to the same depth axis to which the drilling data is mapped. As a result, mapped sonic log data and mapped drilling data can be interpolated along the same depth axis to ensure that corresponding drilling data and sonic data exists at varying depth levels. In particular, drilling data points at a specific depth level and across different drilling parameters can have one or more corresponding sonic log data points, e.g. corresponding to different sonic log measurements, at the specific depth level.

FIGS. 8A-C illustrate graphs of sonic log data as a function of depth that can be accessed and interpolated with drilling parameter data, e.g. at step 506. Specifically, FIG. 8A illustrate an example of compressional wave slowness, otherwise referred to as DTC, as a function of depth. FIG. 8B illustrates an example of shear wave slowness, otherwise referred to as DTS, as a function of depth. FIG. 8C illustrates an example of the ratio of DTS over DTC as a function of depth.

Returning back to the flowchart shown in FIG. 5, at step 508, depth dependency is imparted to the sonic data and the corresponding drilling data. Specifically, in imparting depth dependency to the sonic log data and the corresponding drilling data, corresponding data at a specific depth level across the sonic data and the drilling data can be grouped or otherwise related. Further, adjacent drilling data and sonic log data points to the corresponding sonic log data and drilling data at the specific depth level can be grouped or otherwise related with the corresponding sonic log data and drilling data. Adjacent, can be defined by an applicable amount, such as within four depth measurement units within the specific depth level. As follows, this adds depth dependency to the sonic data and drilling data.

At step 510, a model is trained with the sonic data and the corresponding drilling data based on the depth dependency. Specifically, the model can be trained based on the sonic data and drilling data with the depth dependency added at step 508. More specifically, corresponding sonic log data to the drilling data can serve as ground truth data for training the model.

Before training the model, the drilling data and the sonic log data can be scaled to create scaled drilling data and scaled sonic log data. As follows, the scaled data can be used in training the model at step 510. An applicable scaler can be used to scale the drilling data and the sonic log data. Specifically, a scaler can be applied that removes the median and scales the data according to the quantile range. The interquartile range can include the range between the $1^{st}$ quartile ($25^{th}$ quantile) and the $3^{rd}$ quartile ($75^{th}$ quantile).

In training the model, the data can be split for training and testing purposes. Specifically a subset of the data can be used to train the model and a separate subset of the data can be used to test the model. Further, in training the model, an applicable machine learning architecture can be used in developing the model. Specifically, a neural network can be developed and trained using the stochastic gradient descent optimization algorithm, and the weights can be updated using the backpropagation of error algorithm. The gradient descent algorithm seeks to change the weights so that the next evaluation reduces the error, meaning the optimization algorithm is navigating down the gradient of error. The mean squared error can be used as function of loss to estimate the error and update the network weights to reduce that error to the possible minimum value. The neural network can be of an applicable architecture, e.g. using two fully-connected hidden layers. Each hidden layer can have 512 dimensions. After each layer, batch normalization and leaky rectified linear unit can be applied. The output can include applicable formation characteristics that can be identified through sonic logging such as DTC and DTS. While a neural network is discussed in generating the model, other example machine learning architectures can be used such as linear regression models and random forest models.

The techniques that are described herein, e.g. with respect to FIG. 5, can be applied to train a model for predicting sonic log data based on log data that is distinct from sonic log data. Specifically, using the techniques that are described herein, sonic data can be applied to train a model with caliper log data, neutron log data, gamma ray log data, deep resistivity log data, medium resistivity log data, shallow resistivity log data, photoelectric factor and density log data, or a combination thereof, as a substitute for drilling data.

Figure 9:
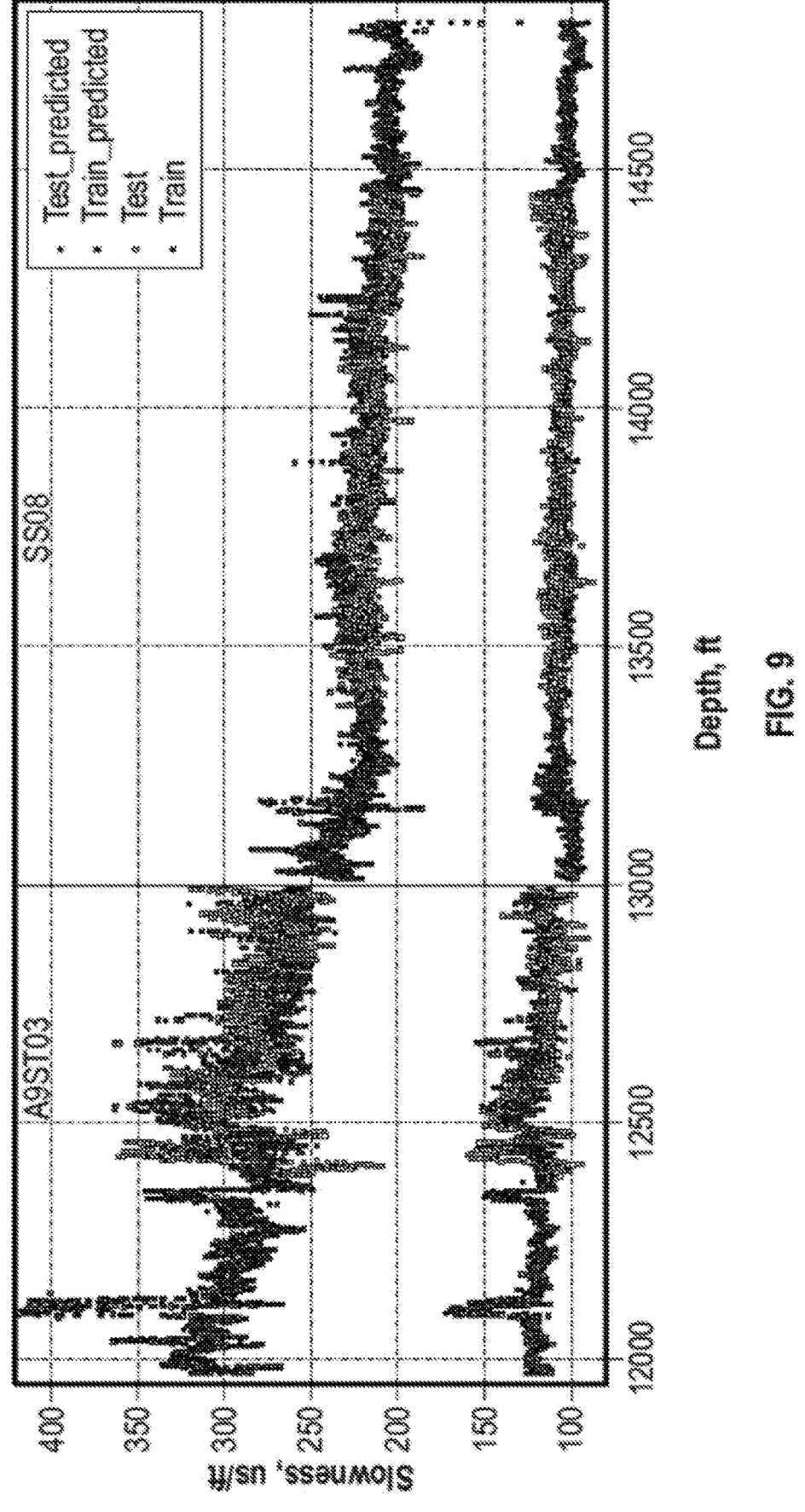
FIG. 9 illustrates a graph of slowness values, including predicted slowness values, as a function of depth, in accordance with various aspects of the subject technology.

FIG. 9 illustrates a graph of slowness values, including predicted slowness values, as a function of depth. Specifically, the slowness values shown in FIG. 9 include testing data and training data that was used in training a model according to the techniques described herein. Further, the slowness values also include predicted slowness values obtained by applying the model according to the techniques described herein.

Figure 10:
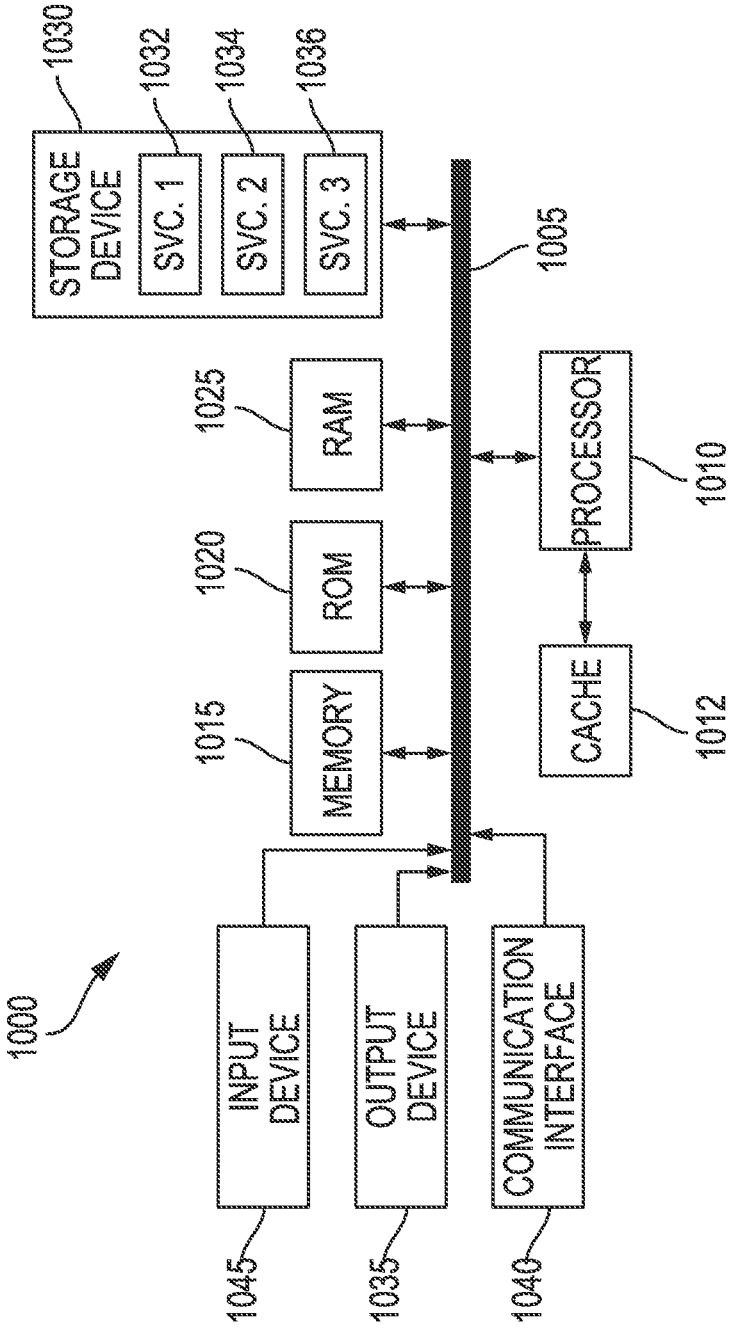
FIG. 10 illustrates an example computing device architecture which can be employed to perform various steps, methods, and techniques disclosed herein.

FIG. 10 illustrates an example computing device architecture 1000 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 10 illustrates an example computing device architecture 1000 of a computing device which can implement the various technologies and techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising accessing data associated with a wellbore in a formation; accessing a model configured to identify one or more characteristics associated with sound traveling through one or more formations; and applying the data to the model to predict a characteristic of the formation that is identifiable through sonic logging.

Statement 2. The method of statement 1, wherein the characteristic of the formation that is identifiable through sonic logging includes one of compressional wave slowness of a portion of the formation, shear wave slowness of the portion of the formation, a ratio of the compressional wave slowness of the portion of the formation to the shear wave slowness of the portion of the formation, Young's modulus of the portion of the formation, Poisson's ratio of the portion of the formation, and vibrational types associated with the portion of the formation.

Statement 3. The method of any of statements 1 and 2, wherein the characteristic of the formation that is identifiable through sonic logging serves as a substitute for data missing from a sonic log of the formation.

Statement 4. The method of any of statements 1 through 3, wherein the data associated with the wellbore includes drilling data associated with operation of a drill string in drilling the wellbore and the drilling data comprises torque, weight-on-bit, mud pumping rate, rotating speed, drilling fluid pumping pressure, rate of penetration, peak axial vibrations, absolute average vibrations, lateral vibrations, average pitch, average yaw, depth of cut downhole, and downhole temperature.

Statement 5. The method of any of statements 1 through 4, wherein the model is trained with drilling data associated with drilling one or more wellbores and sonic log data generated for formations around the one or more wellbores.

Statement 6. The method of any of statements 1 through 5, wherein the drilling data comprises values of a plurality of drilling variables, the method further comprising: identifying redundant variables amongst the plurality of drilling variables based on correlation between the plurality of drilling variables; remove one of corresponding redundant variables in the identified redundant variables to generate modified drilling data; and training the model based on the modified drilling data.

Statement 7. The method of any of statements 1 through 6, wherein the drilling data comprises data across a specific range, the method further comprising: identifying a subset of the specific range in which to confine the drilling data; confining the drilling data to the subset of the specific range to generate modified drilling data; and training the model based on the modified drilling data.

Statement 8. The method of any of statements 1 through 7, further comprising: mapping the drilling data across varying depth levels of the wellbore to generate mapped drilling data; remove outliers in the mapped drilling data across the varying depth levels through a moving filter applied across the varying depth levels to generate modified mapped drilling data; interpolating the drilling data across different drilling variables and the varying depth levels to further generate the modified mapped drilling data; and training the model based on the modified mapped drilling data.

Statement 9. The method of any of statements 1 through 8, further comprising: mapping the drilling data across varying depth levels of the wellbore to generate mapped drilling data; mapping the sonic log data across the varying depth levels of the wellbore to generate mapped sonic log data; interpolating the mapped sonic log data with the mapped drilling data to create corresponding drilling data points and sonic log data points at different depth levels of the varying depth levels of the wellbore; and training the model based on the corresponding drilling data points and sonic log data points.

Statement 10. The method of any of statements 1 through 9, further comprising: identifying a corresponding first drilling data point and a first sonic log data point at a specific depth of the corresponding drilling data points and sonic log data points; accessing one or more adjacent drilling data points and one or more adjacent sonic log data points at one or more adjacent depths to the specific depth; training the model based on: the corresponding first drilling data point and the first sonic log data point, the one or more adjacent drilling data points, and the one or more sonic log data points; and a parameter that the one or more adjacent drilling data points and the one or more adjacent sonic log data points are related to the first drilling data point and the first sonic log data point based on depth.

Statement 11. The method of any of statements 1 through 10, further comprising: scaling the drilling data and the sonic log data to generate scaled drilling data and scaled sonic log data; and training the model based on the scaled drilling data and the scaled sonic log data.

Statement 12. The method of any of statements 1 through 11, wherein the data associated with the wellbore comprises log data of either or both the wellbore itself and a neighboring wellbore.

Statement 13. The method of any of statements 1 through 12, wherein the model is trained with log data that is distinct from sonic log data for either or both the wellbore itself and a neighboring wellbore.

Statement 14. The method of any of statements 1 through 13, wherein the log data that is district from the sonic log data comprises caliper log data, neutron log data, gamma ray log data, deep resistivity log data, medium resistivity log data, shallow resistivity log data, photoelectric factor and density log data, or a combination thereof.

Statement 15. A system comprising: one or more processors; and at least one computer-readable storage medium having stored therein instructions which, when executed by the one or more processors, cause the one or more processors to: access data associated with a wellbore in a formation; access a model configured to identify one or more characteristics associated with sound traveling through one or more formations; and apply the data to the model to predict a characteristic of the formation that is identifiable through sonic logging.

Statement 16. The system of statement 15, wherein the data associated with the wellbore includes drilling data associated with operation of a drill string in drilling the wellbore and the drilling data comprises torque, weight-on-bit, mud pumping rate, rotating speed, drilling fluid pumping pressure, rate of penetration, or a combination thereof.

Statement 17. The system of any of statements 15 and 16, wherein the model is trained with drilling data associated with drilling one or more wellbores and sonic log data generated for formations around the one or more wellbores.

Statement 18. The system of any of statements 15 through 17, wherein the data associated with the wellbore comprises log data of either or both the wellbore itself and a neighboring wellbore.

Statement 19. The system of any of statements 15 through 18, wherein the model is trained with log data that is distinct from sonic log data for either or both the wellbore itself and a neighboring wellbore.

Statement 20. A non-transitory computer-readable storage medium having stored therein instructions which, when executed by one or more processors, cause the one or more processors to: access data associated with a wellbore in a formation; access a model configured to identify one or more characteristics associated with sound traveling through one or more formations; and apply the data to the model to predict a characteristic of the formation that is identifiable through sonic logging.

Statement 21. A system comprising means for performing a method according to any of statements 1 through 14.

What is claimed is:

1. A method comprising:

accessing data associated with a wellbore in a formation;

accessing a model configured to identify one or more characteristics associated with sound traveling through one or more formations;

applying the data to the model to predict a characteristic of the formation that is identifiable through sonic logging;

synthesizing sonic logs based on the predicted characteristic of the formation by substituting the predicted characteristic of the formation for the data missing from the sonic logs;

selecting a type of drill bit for drilling the wellbore through the formation based on the predicted characteristic and the synthesized sonic logs; and controlling a speed of the drill bit while drilling the wellbore through the formation based on the predicted characteristic and the synthesized sonic logs.

2. The method of claim 1, wherein the characteristic of the formation that is identifiable through sonic logging includes one of compressional wave slowness of a portion of the formation, shear wave slowness of the portion of the formation, a ratio of the compressional wave slowness of the portion of the formation to the shear wave slowness of the portion of the formation, Young's modulus of the portion of the formation, Poisson's ratio of the portion of the formation, and vibrational types associated with the portion of the formation.

3. The method of claim 1, wherein the characteristic of the formation that is identifiable through sonic logging serves as a substitute for data missing from a sonic log of the formation.

4. The method of claim 1, wherein the data associated with the wellbore includes drilling data associated with operation of a drill string in drilling the wellbore and the drilling data comprises torque, weight-on-bit, mud pumping rate, rotating speed, drilling fluid pumping pressure, rate of penetration, peak axial vibrations, absolute average vibrations, lateral vibrations, average pitch, average yaw, depth of cut downhole, and downhole temperature.

5. The method of claim 1, wherein the model is trained with drilling data associated with drilling one or more wellbores and sonic log data generated for formations around the one or more wellbores.

6. The method of claim 5, wherein the drilling data comprises values of a plurality of drilling variables, the method further comprising:

identifying redundant variables amongst the plurality of drilling variables based on correlation between the plurality of drilling variables;

remove one of corresponding redundant variables in the identified redundant variables to generate modified drilling data; and training the model based on the modified drilling data.

7. The method of claim 5, wherein the drilling data comprises data across a specific range, the method further comprising:

identifying a subset of the specific range in which to confine the drilling data;

confining the drilling data to the subset of the specific range to generate modified drilling data; and training the model based on the modified drilling data.

8. The method of claim 5, further comprising:

mapping the drilling data across varying depth levels of the wellbore to generate mapped drilling data;

remove outliers in the mapped drilling data across the varying depth levels through a moving filter applied across the varying depth levels to generate modified mapped drilling data;

interpolating the drilling data across different drilling variables and the varying depth levels to further generate the modified mapped drilling data; and training the model based on the modified mapped drilling data.

9. The method of claim 5, further comprising:

mapping the drilling data across varying depth levels of the wellbore to generate mapped drilling data;

mapping the sonic log data across the varying depth levels of the wellbore to generate mapped sonic log data;

interpolating the mapped sonic log data with the mapped drilling data to create corresponding drilling data points and sonic log data points at different depth levels of the varying depth levels of the wellbore; and training the model based on the corresponding drilling data points and sonic log data points.

10. The method of claim 9, further comprising:

identifying a corresponding first drilling data point and a first sonic log data point at a specific depth of the corresponding drilling data points and sonic log data points;

accessing one or more adjacent drilling data points and one or more adjacent sonic log data points at one or more adjacent depths to the specific depth;

training the model based on:

the corresponding first drilling data point and the first sonic log data point, the one or more adjacent drilling data points, and the one or more sonic log data points; and a parameter that the one or more adjacent drilling data points and the one or more adjacent sonic log data points are related to the first drilling data point and the first sonic log data point based on depth.

11. The method of claim 5, further comprising:

scaling the drilling data and the sonic log data to generate scaled drilling data and scaled sonic log data; and training the model based on the scaled drilling data and the scaled sonic log data.

12. The method of claim 1, wherein the data associated with the wellbore comprises log data of either or both the wellbore itself and a neighboring wellbore.

13. The method of claim 1, wherein the model is trained with log data that is distinct from sonic log data for either or both the wellbore itself and a neighboring wellbore.

14. The method of claim 13, wherein the log data that is district from the sonic log data comprises caliper log data, neutron log data, gamma ray log data, deep resistivity log data, medium resistivity log data, shallow resistivity log data, photoelectric factor and density log data, or a combination thereof.

15. A system comprising:

one or more processors; and at least one computer-readable storage medium having stored therein instructions which, when executed by the one or more processors, cause the one or more processors to:

access data associated with a wellbore in a formation;

access a model configured to identify one or more characteristics associated with sound traveling through one or more formations;

apply the data to the model to predict a characteristic of the formation that is identifiable through sonic logging;

synthesizing sonic logs based on the predicted characteristic of the formation by substituting the predicted characteristic of the formation for the data missing from the sonic logs;

select a type of drill bit for drilling the wellbore through the formation based on the predicted characteristic and the synthesized sonic logs; and control a speed of the drill bit while drilling the wellbore through the formation based on the predicted characteristic and the synthesized sonic logs.

16. The system of claim 15, wherein the data associated with the wellbore includes drilling data associated with operation of a drill string in drilling the wellbore and the drilling data comprises torque, weight-on-bit, mud pumping rate, rotating speed, drilling fluid pumping pressure, rate of penetration, or a combination thereof.

17. The system of claim 15, wherein the model is trained with drilling data associated with drilling one or more wellbores and sonic log data generated for formations around the one or more wellbores.

18. The system of claim 15, wherein the data associated with the wellbore comprises log data of either or both the wellbore itself and a neighboring wellbore.

19. The system of claim 15, wherein the model is trained with log data that is distinct from sonic log data for either or both the wellbore itself and a neighboring wellbore.

20. A non-transitory computer-readable storage medium having stored therein instructions which, when executed by one or more processors, cause the one or more processors to:

access data associated with a wellbore in a formation;

access a model configured to identify one or more characteristics associated with sound traveling through one or more formations;

apply the data to the model to predict a characteristic of the formation that is identifiable through sonic logging;

synthesizing sonic logs based on the predicted characteristic of the formation by substituting the predicted characteristic of the formation for the data missing from the sonic logs;

select a type of drill bit for drilling the wellbore through the formation based on the predicted characteristic and the synthesized sonic logs; and control a speed of the drill bit while drilling the wellbore through the formation based on the predicted characteristic and the synthesized sonic logs.

* * * * *